(12) United States Patent
Witkus (10) Patent No.: US 7,198,148 B1
(45) Date of Patent: Apr. 3, 2007

(54) MODULAR CONVEYOR BELT WITH CAM FLIGHTS

(75) Inventor: Christopher Witkus, Shoemakersville, PA (US)

(73) Assignee: Habasit AG, Reinach-Basel (CH)

( * ) Notice: Subject to any disclaimer, the term of this patent is extended or adjusted under 35 U.S.C. 154(b) by 0 days.

(21) Appl. No.: 11/477,296

(22) Filed: Jun. 28, 2006

(51) Int. Cl.
*B65G 39/20* (2006.01)

(52) U.S. Cl. ...................................... 198/845; 198/853

(58) Field of Classification Search ................ 198/850, 198/851, 853, 845
See application file for complete search history.

(56) References Cited

U.S. PATENT DOCUMENTS

| | | | |
|---|---|---|---|
| 4,742,907 A | 5/1988 | Palmaer | |
| 5,165,514 A | 11/1992 | Faulkner | |
| 5,413,211 A | 5/1995 | Faulkner | |
| 5,469,956 A | 11/1995 | Greve et al. | |
| 6,554,129 B2 | 4/2003 | Straight et al. | |
| 6,564,933 B2* | 5/2003 | Morimoto et al. | 198/850 |
| 6,695,135 B1 | 2/2004 | Lapeyre | |
| 6,708,818 B2* | 3/2004 | Kato et al. | 198/853 |
| 6,827,204 B2* | 12/2004 | Cribiu' | 198/844.1 |
| 6,986,420 B2* | 1/2006 | Weiser et al. | 198/853 |
| 7,097,030 B2* | 8/2006 | Gundlach | 198/834 |

FOREIGN PATENT DOCUMENTS

NL    1021084 C    1/2004

* cited by examiner

*Primary Examiner*—Joe Dillon, Jr.
(74) *Attorney, Agent, or Firm*—Thomas M. Freiburger (57) ABSTRACT

A modular plastic conveyor belt of the type made up of a multiplicity of module rows connected by interdigited link ends secured by pins has camming members at selected locations on the bottom surface of the belt to provide a flight dynamically. The camming members preferably are connected to two successive connecting pivot pins and hang down below the belt at an oblique angle during regular belt travel, sliding through grooves formed in the supporting track. At locations where a raised flight is desired to move products along with the belt, the camming member engages track structure so as to raise two module rows into an upwardly pitched roof-like configuration to form a flight. Hold-downs preferably are included before and after the location of the two involved module rows, to hold the belt flat to the support track or platform except at the flight itself.

15 Claims, 6 Drawing Sheets

MODULAR CONVEYOR BELT WITH CAM FLIGHTS

BACKGROUND OF THE INVENTION

This invention concerns modular plastic conveyor belts, and specifically a modular belt with flights at selected positions to move conveyed products along, usually on inclines.

Conveyor belts formed of plastic modules are highly versatile in being capable of fabrication in virtually any length or width, and the belts can include various accessories. One type of accessory is known as a flight. Flight modules usually take the place of regular modules in some or all of a module row, so as to provide a pushing device for conveyed products on inclines and to prevent accumulation. Alternatively, flights can be connected to modules. Often used in food industries, these flights can be employed in conveying potato chips, crackers, vegetables, fruit, breads and other food products. Modular flight or added-on conveyor belt flights are shown, for example, in U.S. Pat. Nos. 6,695,135, 6,554,129, 5,469,956, 5,413,211 and 5,165,514. The flights are primarily used for incline applications, although the same flighted belt often goes through both inclined and horizontal sections.

One problem or limitation with flights is that in situations where the belt must be scraped clean of product, the flights interfere with scraping the belt. Food products with oils often tend to stick to the belt even where the belt returns around a roller, so that the belt has to be scraped to remove the conveyed items. Thus, conventional flights often cannot be used in situations where they are needed or would be helpful.

It is an objective of this invention to produce flights dynamically in the travel of a belt, flights that are present on the belt where needed but not in locations where the conveyed product is to be scraped off the belt. Flights with this general function have been provided previously (as in Dutch patent publication No. 1021084, Jan. 20, 2004), but have not been effectively and efficiently held down in areas where the belt is desired to be flat.

SUMMARY OF THE INVENTION

The current invention produces such dynamic flights, in portions of belt travel where desired. A modular plastic conveyor belt of the type made up of a multiplicity of connected module rows has camming members at selected locations on the bottom surface of the belt. The camming members preferably are connected to two successive connecting pivot pins and hang down below the belt at an oblique angle during regular belt travel, sliding through grooves formed in the supporting track. Through travel locations where a raised flight is desired to move products along with the belt, the camming member engages track structure so as to raise two module rows into an upwardly pitched roof-like configuration to form a flight. Hold-downs preferably are included before and after the location of the two involved module rows, to hold the belt flat to the support track or platform except at the flight itself, preventing "tenting" of the belt in front of and behind the moving flight.

In one preferred embodiment of the invention, a modular plastic conveyor belt has dynamically raised flights to engage and move along products being conveyed while also providing for flattening of the belt surface for removal of products or cleaning. The conveyor belt includes a camming member connected to a lower side of the belt by two successive connecting pins, the camming member having a bottom surface which is angled obliquely downwardly and rearwardly relative to the direction of travel of the belt when the belt is in a generally planar configuration so as not to produce a raised flight at the location of the camming member. The belt preferably includes at least two such camming members connected via said two successive connecting pins, the camming members being spaced apart and in generally parallel relationship. Thus the conveyor belt can cooperate with a supporting track or platform, which has an extended longitudinal groove at the lateral position of each angled camming member, such that each camming member resides down in the groove in portions of the belt travel where a raised flight is not desired. This permits scraping products off the non-raised surface of the belt, or cleaning of the belt surface. In locations where a raised flight is desired across the width of the belt, the groove is essentially absent so that the bottom surface of the camming member pivots and rises to a flat and essentially horizontal orientation along the track or platform surface, pushing upwardly one connecting pin along the entire width of the belt and thus creating a roof-shaped raised flight made up of two adjacent module rows, for moving conveyed products along with the belt.

As noted above, hold-down devices are positioned in the belt forward of and aft of the camming member, and are engaged with the track or platform to hold module rows down against the track or platform both forward and aft of the two adjacent module rows creating the raised flight. In a preferred embodiment the hold-down devices comprise structures connected to the bottom side of the conveyor belt by a pair of successive connecting pins, and each having a roller positioned on an axis generally transverse to the belt and spaced below the bottom of the belt, for low-friction engagement under track structure as the belt moves along. The hold-down devices preferably are positioned immediately fore and aft of the two adjacent module rows that produce the raised flight, to prevent "tenting" of the belt, which is under longitudinal tension. Other hold-down devices have been known in conveyor belts, such as shown in U.S. Pat. No. 4,742,907, which was for the purpose of holding the belt edge against lifting at the outside of a turn in a radius conveyor belt. Edge hold-downs if used with cam flights have the disadvantage of restricting the width of the belt and not being as effective as the hold-downs of the current invention, especially in a wide belt.

It is therefore among the objects of the invention to produce flights in a modular plastic conveyor belt, only in portions of belt travel where the flights are needed, allowing for scraping product off the belt or cleaning the belt at other locations; and to hold the belt down substantially flat against the track or platform in positions fore and aft of the raised flight to prevent "tenting" of the belt in front of and behind the flight. These and other objects, advantages and features of the invention will be apparent from the following description of a preferred embodiments, considered along with the accompanying drawings.

DESCRIPTION OF PREFERRED EMBODIMENTS

Figure 1:
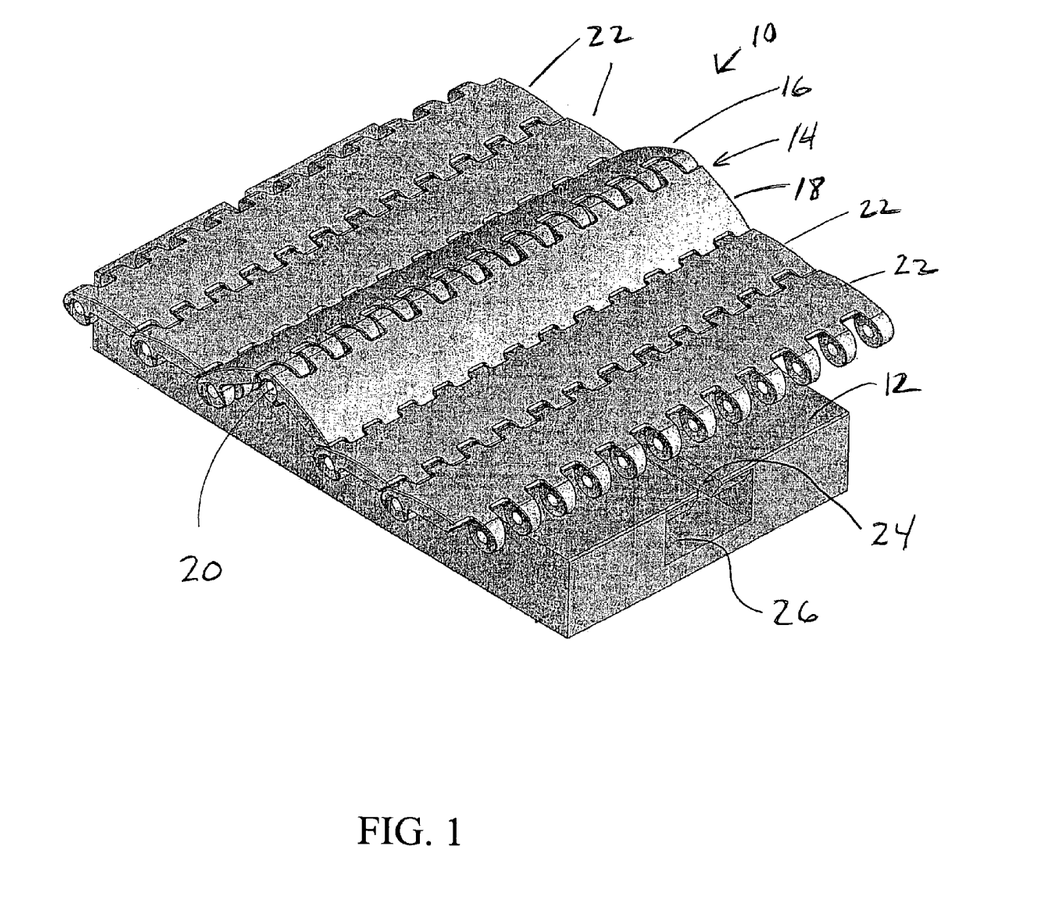
FIG. 1 is a perspective view schematically indicating a section of a conveyor belt of the invention with a raised flight formed of two adjacent module rows.

FIG. 1 shows a section of a conveyor belt 10, a modular plastic conveyor belt generally of the type disclosed in U.S. Pat. Nos. 5,706,934 and 5,613,597, for example. Also shown is a section of a track or support platform 12 on which the belt is supported and slides in the course of its travel.

As discussed above, the belt 10 and accompanying support platform or track dynamically provide a product-engaging flight 14 or cam flight that travels with the belt through portions of belt travel where desired. The flight 14 is formed by two adjacent module rows 16 and 18, these rows being connected together by a connecting rod or pin 20. FIG. 1 shows a simplified form of belt in which the module rows 16 and 18, as well as remaining module rows 22, are shown schematically as comprised of a single module per row. It should be understood that the rows can have a plurality of modules, and nearly always do in the event of wider belts, such as wider than about six inches in width. A minimum-width belt might include only one module per row.

Figure 2:
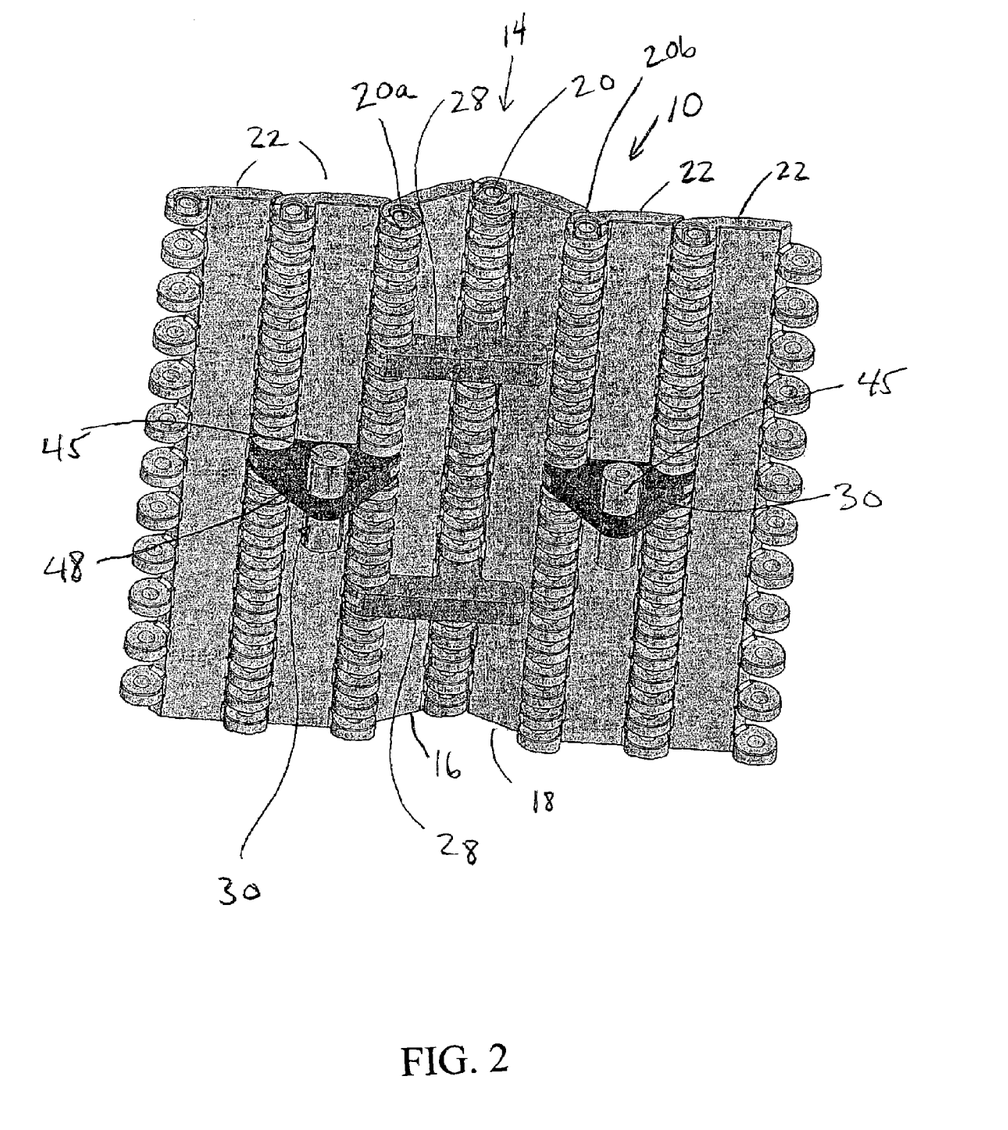
FIG. 2 is a perspective view schematically showing the underside of a section of the conveyor belt.
Figure 3:
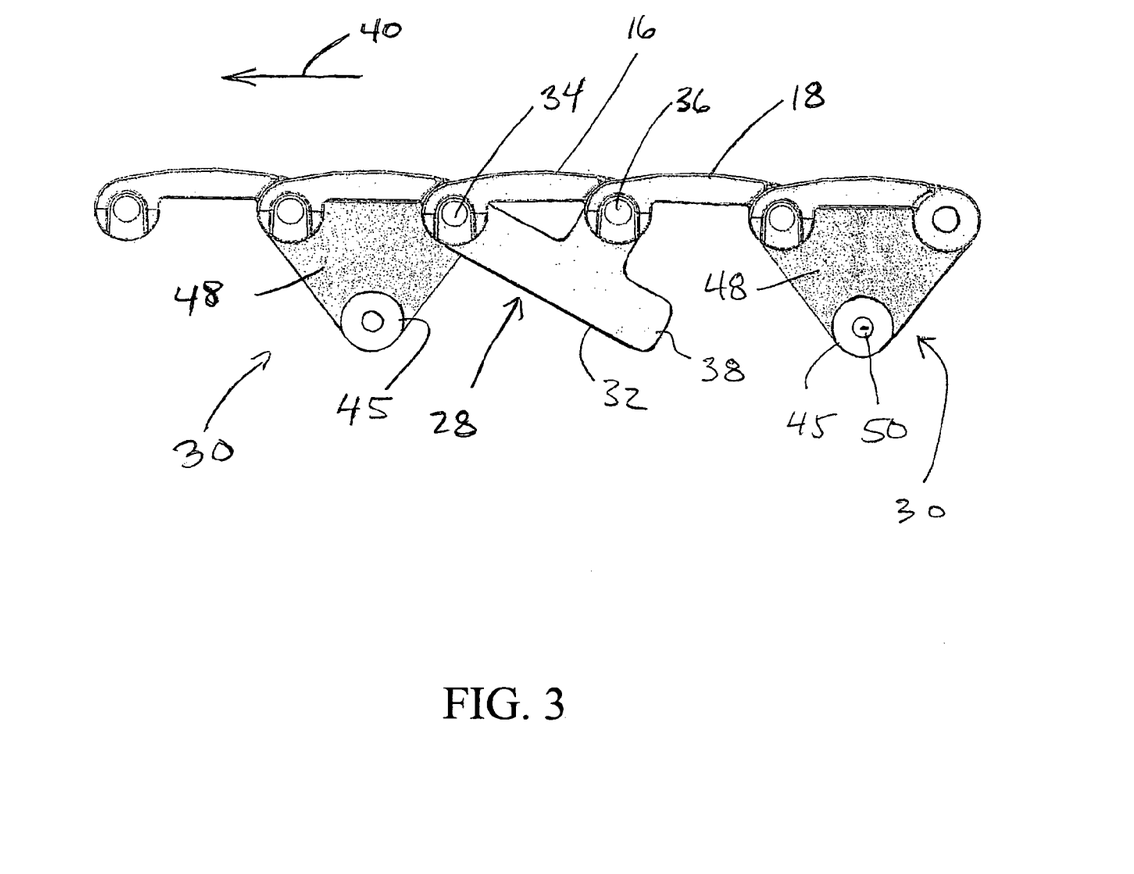
FIG. 3 is a side elevation view schematically showing several module rows of a conveyor belt with cam flights and hold-downs pursuant to the invention, with the belt shown in flight configuration.
Figure 4:
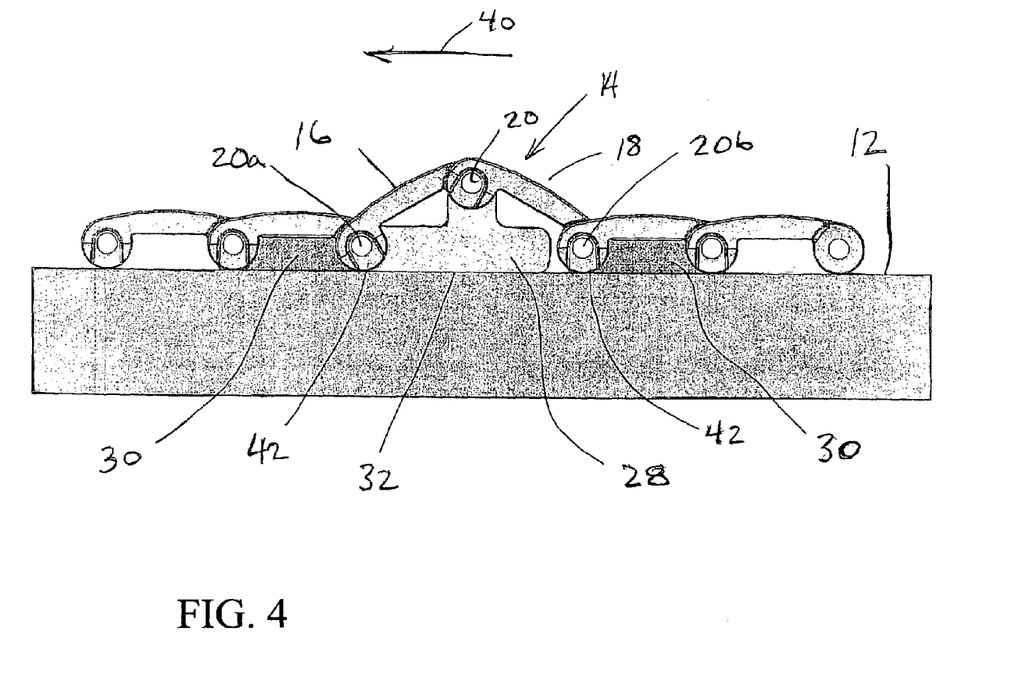
FIG. 4 is a side elevation view showing a section of conveyor belt with a cam flight in the raised position.
Figure 5:
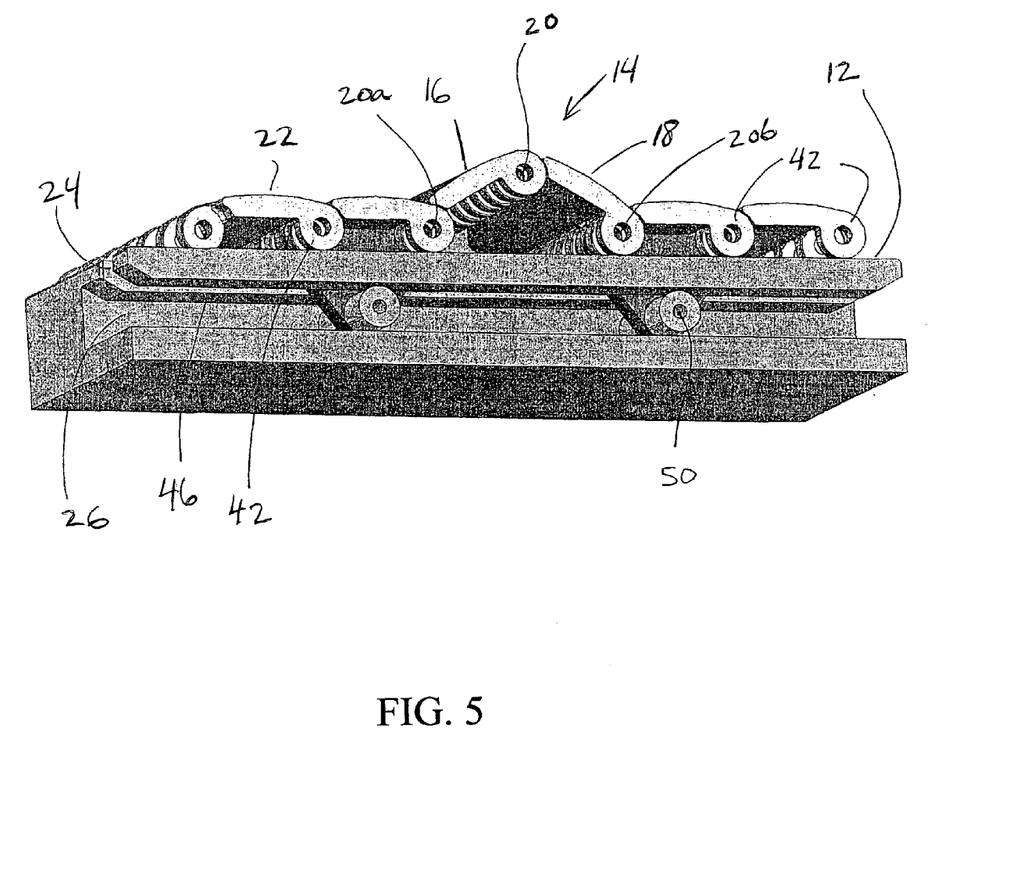
FIG. 5 is a perspective view showing a section of conveyor belt and supporting track, with a raised flight and illustrating an embodiment of hold-down devices for the belt.
Figure 6:
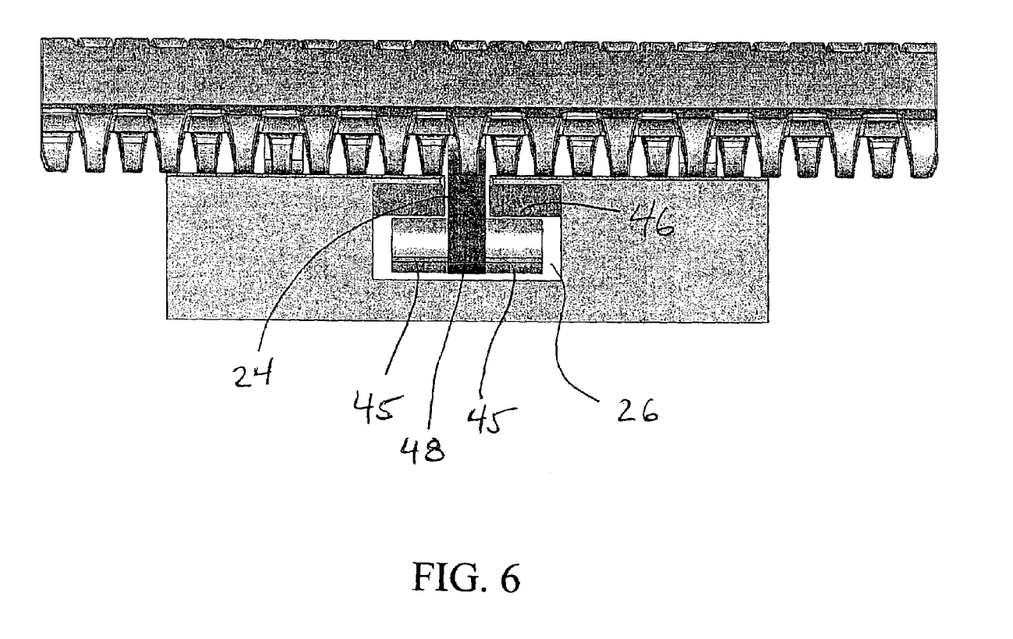
FIG. 6 is a transverse cross sectional view showing a portion of the belt and illustrating a hold-down device.

The track 12 shown in FIG. 1 is illustrated with a groove 24, opening to a wider channel 26, the purpose of which is understood by reference to the remaining drawings. FIGS. 2–6 show the illustrated portion of the belt 10 and show a structure on the bottom of the belt for producing the cam flight 14 where desired. This structure includes camming members 28 and hold-down devices 30. The camming members, of which at least one is provided (for a narrow belt) and preferably two or more throughout the width of a belt, especially a belt of greater than minimum width, are connected to the belt at connecting pins 20 at two consecutive connecting pin positions. Each camming member 28 has a bottom side 32 which is preferably flat, or at least defines a flat plane with two or more contact points, and two pivot positions 34 and 36 such as shown especially in FIGS. 3 and 4. These pivot positions can be at the ends of legs as shown in the drawing, such that the camming member is generally T-shaped as shown, or they can be a different shape, such as essentially a solid triangle, with or without a rearwardly hanging extension 38. It can be envisioned from these drawings that the entire camming member 28 could be a triangle and still define a bottom surface 32 of similar dimension to what is shown in FIGS. 2, 3 and 4. The configuration shown is efficient in material.

FIG. 3 shows that in non-flight configuration, with the belt's top surface essentially flat such as for scraping off conveyed products or cleaning the belt, the camming members 28 hang down below the belt with the bottom, track-contacting surface 32 obliquely angled downwardly/rearwardly. The travel direction of the belt is shown by the arrow 40 in FIGS. 3 and 4. In the track or support platform a downwardly extending groove is provided for each of the camming members 28 for the situation shown in FIG. 3 when the raised flight is not desired. Thus, the groove, not shown in these drawings, exists only in portions of the support platform where the belt surface is to be flat such as for scraping product off the belt. When the belt reaches the location where the cam flight is to be raised, however, the groove ends and the camming members 28 are rotated upwardly to the bottom-horizontal position shown in FIG. 4. An incline or curve can be included in the track for a smooth transition. The motion of the belt, with the camming member 28 engaging with the track, forces the cam-connected connecting pin 20 upwardly to raise the two module rows into angled, roof-like relationship as shown.

It is apparent that, with some degree of tension existing in the conveyor belt 10, the raising of a single connecting pin 20 would tend to cause "tenting" of the belt. In this condition the link ends 42 and connecting pins at adjacent locations, at least at the connecting pin 20b and to a lesser extent at the connecting pin 20a shown in FIGS. 2, 3 and 4, would tend to lift off the track 12. For this reason, hold-downs 30 are included preferably immediately before and immediately after the cam flight 14. The hold-downs extend down into the track and are accommodated by the grooves and channels 24, 26 shown in FIG. 1 and also in FIGS. 5 and 6. The wider channel 26 provides a space for a roller or rollers 45 preferably included on the hold-down to become engaged under track structure 46. As seen in FIGS. 2 through 6, each hold-down may comprise a generally triangular depending bracket 48, secured on two adjacent connecting pins as illustrated, and supporting the roller or rollers 45 at a level spaced below the bottom surface of the belt. The rollers 45 rotate on axes 50 that are generally horizontal and transverse to the direction of travel of the belt. These rollers engage the bottom side of the track structure 46 in a low-friction manner, rolling along the bottom surface of that structure, so as to hold the belt module rows down close to the track in spite of belt tension that tends to cause "tenting" of the belt.

It should be understood that the hold-down devices 30 can take different configurations from what is shown. The bracket 48 could be generally T-shaped as appearing from the side, or could be a rectangle or other shapes. The rollers could be on one side only of the bracket 48, and although rollers are preferred, these could be fixed members that co-act with the track structure 46 with very low friction, if desired. If rollers are employed, these are preferably formed of plastic material with roller bearings on a steel shaft (not shown). The brackets preferably are formed of molded plastic, which may be similar to the material from which the belt modules are formed.

As noted above, prior modular plastic conveyor belts have employed hold-downs at outer edges of a belt. The hold-downs can be included at several different positions through the width of the belt if needed, pursuant to the invention.

An additional benefit of the configuration described above is that as the cam flight disengages and the belt straightens, a "snapping" action can be created which jars the conveyed product loose from the belt (especially with regard to oily products) before scraping. If desired a "snapping" action could also be produced by releasing the hold-downs before the cam flight is disengaged.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In a modular plastic conveyor belt of the type made of a multiplicity of module rows each containing one or more belt modules having link ends at fore and aft ends, the link ends being interdigited with link ends of preceding and succeeding module rows and connected together by connecting pins, an improvement to provide raised flights to engage and move along products being conveyed on the belt while also providing for the ability to flatten the belt surface for removal of products or cleaning, comprising:

at least one camming member connected to a lower side of the belt by two successive connecting pins, the camming member having a bottom surface which is angled obliquely downwardly and rearwardly relative to a direction of travel of the belt when the belt is in a generally planar configuration and not producing a raised flight at the location of the camming member, and hold-down devices positioned forward of and aft of the camming member in the belt, for engagement with a longitudinal groove of a supporting track or platform below the belt to hold module rows down against the track or platform both forward and aft of two adjacent module rows creating the raised flight, whereby the conveyor belt can cooperate with the track or platform at the position of each angled camming member such that each camming member resides down in the groove in portions of the belt travel where a raised flight is not desired, permitting clearing of conveyed products by scraping them off the non-raised surface of the belt or permitting cleaning by wiping the belt surface, and whereby, in locations where a raised flight is desired across the width of the belt, the groove is essentially absent so that the bottom surface of the camming member pivots and rises to a flat and essentially horizontal orientation along the track or platform surface, pushing upwardly one connecting pin along the width of the belt and thus creating a roof-shaped raised flight from the two adjacent module rows for moving conveyed products along with the belt, with the belt held generally flat forward and aft of the raised flight by the hold-down devices.

2. The improvement of claim 1, wherein the hold-down devices each comprise structures connected to the bottom side of the conveyor belt by a pair of successive connecting pins, and each having a roller positioned on an axis generally transverse relative to the belt and spaced below the bottom of the belt, for engaging under track structure as the belt moves along.

3. The improvement of claim 2, in combination with a track or platform including a groove to receive the hold-down device with the roller positioned beneath the groove.

4. The improvement of claim 1, wherein the hold-down devices are connected to the belt module rows such that the roller is directly beneath a module row.

5. The improvement of claim 1, wherein the hold-down devices are positioned immediately fore and aft of the two adjacent module rows creating the raised flight.

6. The improvement of claim 1, wherein the belt includes at least two such camming members connected via said two successive connecting pins, the camming members being spaced apart and in generally parallel relationship.

7. In a modular plastic conveyor belt of the type made of a multiplicity of module rows each containing one or more belt modules having link ends at fore and aft ends, the link ends being interdigited with link ends of preceding and succeeding module rows and connected together by connecting pins, an improvement to provide raised flights to engage and move along products being conveyed on the belt while also providing for the ability to flatten the belt surface for removal of products or cleaning, comprising:

at least one camming member connected to a lower side of the belt so as to push the belt upwardly at one connecting pin causing two adjacent module rows to form into a roof-shaped configuration by engagement of the camming member with a surface of a track or platform, and hold-down devices positioned forward of and aft of the camming member in the belt, for engagement with a longitudinal groove of a supporting track or platform below the belt to hold module rows down against the track or platform both forward and aft of two adjacent module rows creating the raised flight, whereby the conveyor belt can cooperate with the track or platform at the position of the camming member such that each camming member resides down in the groove in portions of the belt travel where a raised flight is not desired, permitting clearing of conveyed products by scraping them off the non-raised surface of the belt or permitting cleaning by wiping the belt surface, and whereby, in locations where a raised flight is desired across the width of the belt, the groove is essentially absent so that the camming member engages against the track or platform and pushes upwardly one connecting pin along the width of the belt to thus creating a roof-shaped raised flight from the two adjacent module rows for moving conveyed products along with the belt, with the belt held generally flat forward and aft of the raised flight by the hold-down devices.

8. The improvement of claim 7, wherein the hold-down devices each comprise structures connected to the bottom side of the conveyor belt by a pair of successive connecting pins, and each having a roller positioned on an axis generally transverse relative to the belt and spaced below the bottom of the belt, for engaging under track structure as the belt moves along.

9. The improvement of claim 8, in combination with a track or platform including a groove to receive the hold-down device with the roller positioned beneath the groove.

10. The improvement of claim 7, wherein the hold-down devices are connected to the belt module rows such that the roller is directly beneath a module row.

11. The improvement of claim 7, wherein the hold-down devices are positioned immediately fore and aft of the two adjacent module rows creating the raised flight.

12. The improvement of claim 7, wherein the belt includes at least two such camming members connected via said two successive connecting pins, the camming members being spaced apart and in generally parallel relationship.

13. In a modular plastic conveyor belt of the type made of a multiplicity of module rows each containing one or more belt modules having link ends at fore and aft ends, the link ends being interdigited with link ends of preceding and succeeding module rows and connected together by connecting pins, and including a track or platform on which the conveyor belt rests and travels, an improvement to provide raised flights to engage and move along products being conveyed on the belt while also providing for the ability to flatten the belt surface for removal of products or cleaning, comprising:

at least one camming member connected to a lower side of the belt so as to push the belt upwardly at one connecting pin causing two adjacent module rows to form into a roof-shaped configuration by engagement of the camming member with a surface of the track or platform, and hold-down devices positioned in the belt forward of and aft of the camming member, engaged with the track or platform below the belt to hold module rows down against the track or platform both forward and aft of two adjacent module rows creating the raised flight, the supporting track or platform having a longitudinal groove in a position of alignment with each angled camming member such that each camming member resides down in the groove in portions of the belt travel where a raised flight is not desired, permitting clearing of conveyed products by scraping them off the non-raised surface of the belt or permitting cleaning by wiping the belt surface, and, in locations where a raised flight is desired across the width of the belt, the groove being essentially absent so that the bottom surface of the camming member pivots and rises to a flat and essentially horizontal orientation along the track or platform surface, pushing upwardly one connecting pin along the width of the belt and thus creating a roof-shaped raised flight from the two adjacent module rows for moving conveyed products along with the belt, with the belt held generally flat forward and aft of the raised flight by the hold-down devices.

14. The improvement of claim 13, wherein the hold-down devices each comprise structures connected to the bottom side of the conveyor belt by a pair of successive connecting pins, and each having a roller positioned on an axis generally transverse relative to the belt and spaced below the bottom of the belt, engaged under track structure as the belt moves along.

15. The improvement of claim 14, with the track or platform including a groove to receive the hold-down device with the roller positioned beneath the groove.

* * * * *

UNITED STATES PATENT AND TRADEMARK OFFICE
CERTIFICATE OF CORRECTION

| | |
|---|---|
| PATENT NO. | : 7,198,148 B1 |
| APPLICATION NO. | : 11/477296 |
| DATED | : April 3, 2007 |
| INVENTOR(S) | : Christopher Witkus |

It is certified that error appears in the above-identified patent and that said Letters Patent is hereby corrected as shown below:

Col. 5, claim 1 lines 1-26 should read:

1. In a modular plastic conveyor belt of the type made of a multiplicity of module rows each containing one or more belt modules having link ends at fore and aft ends, the link ends being interdigited with link ends of preceding and succeeding module rows and connected together by connecting pins, an improvement to provide raised flights to engage and move along products being conveyed on the belt while also providing for the ability to flatten the belt surface for removal of products or cleaning, comprising:

at least one camming member connected to a lower side of the belt by two successive connecting pins, the camming member having a bottom surface which is angled obliquely downwardly and rearwardly relative to a direction of travel of the belt when the belt is in a generally planar configuration and not producing a raised flight at the location of the camming member, and     hold-down devices positioned forward of and aft of the camming member in the belt, for engagement with a ~~longitudinal groove of a supporting~~ track or platform below the belt to hold module rows down against the track or platform both forward and aft of two adjacent module rows creating the raised flight,     whereby the conveyor belt can cooperate with <u>a supporting</u> ~~the~~ track or platform <u>having a longitudinal groove</u> at the position of each angled camming member such that each camming member resides down in the groove in portions of the belt travel where a raised flight is not desired, permitting clearing of conveyed products by scraping them off the non-raised surface of the belt or permitting cleaning by wiping the belt surface, and whereby, in locations where a raised flight is desired across the width of the belt, the groove is essentially absent so that the bottom surface of the camming member pivots and rises to a flat and essentially horizontal orientation along the track or platform surface, pushing upwardly one connecting pin along the width of the belt and thus creating a roof-shaped raised flight from the two adjacent module rows for moving conveyed products along with the belt, with the belt held generally flat forward and aft of the raised flight by the hold-down devices.

UNITED STATES PATENT AND TRADEMARK OFFICE
CERTIFICATE OF CORRECTION

| | |
|---|---|
| PATENT NO. | : 7,198,148 B1 |
| APPLICATION NO. | : 11/477296 |
| DATED | : April 3, 2007 |
| INVENTOR(S) | : Christopher Witkus |

It is certified that error appears in the above-identified patent and that said Letters Patent is hereby corrected as shown below:

Col. 6, claim 7 lines 13-28 should read:

7. In a modular plastic conveyor belt of the type made of a multiplicity of module rows each containing one or more belt modules having link ends at fore and aft ends, the link ends being interdigited with link ends of preceding and succeeding module rows and connected together by connecting pins, an improvement to provide raised flights to engage and move along products being conveyed on the belt while also providing for the ability to flatten the belt surface for removal of products or cleaning, comprising:
      at least one camming member connected to a lower side of the belt so as to push the belt upwardly at one connecting pin causing two adjacent module rows to form into a roof-shaped configuration by engagement of the camming member with a surface of a track or platform, and
      hold-down devices positioned forward of and aft of the camming member in the belt, for engagement with a ~~longitudinal groove of a supporting~~ track or platform below the belt to hold module rows down against the track or platform both forward and aft of two adjacent module rows creating the raised flight,
      whereby the conveyor belt can cooperate with <u>a supporting</u> ~~the~~ track or platform <u>having a longitudinal groove</u> at the position of the camming member such that each camming member resides down in the groove in portions of the belt travel where a raised flight is not desired, permitting clearing of conveyed products by scraping them off the non-raised surface of the belt or permitting cleaning by wiping the belt surface, and whereby, in locations where a raised flight is desired across the width of the belt, the groove is essentially absent so that the camming member engages against the track or platform and pushes upwardly one connecting pin along the width of the belt to thus ~~creating~~ <u>create</u> a roof-shaped raised flight from the two adjacent module rows for moving conveyed products along with the belt, with the belt held generally flat forward and aft of the raised flight by the hold-down devices.

Col. 7, claim 13 line 54 - col. 8 line 7 should read:

13. In a modular plastic conveyor belt of the type made of a multiplicity of module rows each containing one or more belt modules having link ends at fore and aft ends, the link ends being interdigited with link ends of preceding and succeeding module rows and connected together by connecting pins, and including a track or platform on which the conveyor belt rests and travels, an improvement to provide raised flights to engage and move along products being conveyed on the belt while also providing for the ability to flatten the belt surface for removal of products or cleaning, comprising:

UNITED STATES PATENT AND TRADEMARK OFFICE
CERTIFICATE OF CORRECTION

PATENT NO. : 7,198,148 B1
APPLICATION NO. : 11/477296
DATED : April 3, 2007
INVENTOR(S) : Christopher Witkus It is certified that error appears in the above-identified patent and that said Letters Patent is hereby corrected as shown below:

at least one camming member connected to a lower side of the belt so as to push the belt upwardly at one connecting pin causing two adjacent module rows to form into a roof-shaped configuration by engagement of the camming member with a surface of the track or platform, and
    hold-down devices positioned in the belt forward of and aft of the camming member, engaged with the track or platform below the belt to hold module rows down against the track or platform both forward and aft of <u>the</u> two adjacent module rows creating the raised flight,
    the supporting track or platform having a longitudinal groove in a position of alignment with each angled camming member such that each camming member resides down in the groove in portions of the belt travel where a raised flight is not desired, permitting clearing of conveyed products by scraping them off the non-raised surface of the belt or permitting cleaning by wiping the belt surface, and, in locations where a raised flight is desired across the width of the belt, the groove being essentially absent so that the bottom surface of the camming member pivots and rises to a flat and essentially horizontal orientation along the track or platform surface, pushing upwardly one connecting pin along the width of the belt and thus creating a roof-shaped raised flight from the two adjacent module rows for moving conveyed products along with the belt, with the belt held generally flat forward and aft of the raised flight by the hold-down devices.

Signed and Sealed this

Seventh Day of July, 2009

JOHN DOLL
*Acting Director of the United States Patent and Trademark Office*